US012597412B2

(12) United States Patent
Garbin et al.

(10) Patent No.: US 12,597,412 B2
(45) Date of Patent: Apr. 7, 2026

(54) CONTEXTUAL DIGITAL ASSISTANT FOR PRESENTATION ASSISTANCE

(71) Applicant: Unify Patente GmbH & Co. KG, Munich (DE)

(72) Inventors: Christian Garbin, Boca Raton, FL (US); Karl Klaghofer, Munich (DE); Thomas Lederer, Herrsching (DE); Johannes Ruetschi, Boca Raton, FL (US)

(73) Assignee: UNIFY BETEILIGUNGSVERWALTUNG GMBH & CO. KG, Munich (DE)

( * ) Notice: Subject to any disclaimer, the term of this patent is extended or adjusted under 35 U.S.C. 154(b) by 134 days.

(21) Appl. No.: 18/754,631

(22) Filed: Jun. 26, 2024

(65) Prior Publication Data
US 2025/0069586 A1 Feb. 27, 2025

Related U.S. Application Data

(60) Provisional application No. 63/578,085, filed on Aug. 22, 2023.

(30) Foreign Application Priority Data

Aug. 30, 2023 (EP) .................................... 23194356

(51) Int. Cl.
| | |
|---|---|
| *G06F 17/28* | (2006.01) |
| *G06F 16/438* | (2019.01) |
| *G10L 13/033* | (2013.01) |
| *G10L 15/22* | (2006.01) |
| *H04L 12/18* | (2006.01) |

(52) U.S. Cl.
CPC ........ *G10L 13/033* (2013.01); *G06F 16/4393* (2019.01); *G10L 15/22* (2013.01); *H04L 12/1831* (2013.01); *G10L 2015/228* (2013.01)

(58) Field of Classification Search
CPC .... G06Q 10/103; G06Q 10/00; G06Q 10/107; H04L 12/1831; H04L 67/306; G10L 15/22; G10L 13/033; G10L 2015/228; G06F 16/4393
USPC ........................................................ 704/258
See application file for complete search history.

(56) References Cited

U.S. PATENT DOCUMENTS

| | | | |
|---|---|---|---|
| 6,272,461 | B1 | 8/2001 | Meredith et al. |
| 6,871,318 | B1 | 3/2005 | Wynblatt et al. |
| 7,525,975 | B2 | 4/2009 | Caspi et al. |

(Continued)

FOREIGN PATENT DOCUMENTS

CN 112487395 A * 3/2021 ......... G06K 17/0025

OTHER PUBLICATIONS

Extended European Search Report for European Application No. 23194356.4 dated Jan. 30, 2024.

*Primary Examiner* — Md S Elahee
(74) *Attorney, Agent, or Firm* — Buchanan Ingersoll & Rooney PC

(57) ABSTRACT

A method for presentation assistance can allow seamlessly switching to a pre-recorded presentation, if the speaker who is giving the presentation is not able to continue with it. This can be performed via a digital assistant that is taking over from the speaker using the pre-recorded presentation. A system for implementation of the method can include the digital assistant as well as other system components.

18 Claims, 11 Drawing Sheets

(56)        References Cited

U.S. PATENT DOCUMENTS

| | | | |
|---|---|---|---|
| 7,536,708 | B2 | 5/2009 | Caspi et al. |
| 7,545,758 | B2 | 6/2009 | Caspi et al. |
| 7,756,923 | B2 | 7/2010 | Caspi et al. |
| 7,787,749 | B2 | 8/2010 | Caspi et al. |
| 8,495,496 | B2 * | 7/2013 | Bastide ................ G06Q 10/107 |
| | | | 715/741 |
| 8,539,533 | B2 | 9/2013 | Caspi et al. |
| 9,712,782 | B2 | 7/2017 | Karimi-Cherkandi et al. |
| 10,028,196 | B2 | 7/2018 | Karimi-Cherkandi et al. |
| 10,142,271 | B2 | 11/2018 | Garbin et al. |
| 10,219,124 | B2 | 2/2019 | Garbin et al. |
| 10,250,661 | B2 | 4/2019 | Totzke et al. |
| 10,250,872 | B2 | 4/2019 | Karimi-Cherkandi et al. |
| 10,285,125 | B2 | 5/2019 | Kukosa |
| 10,325,612 | B2 | 6/2019 | Karimi-Cherkandi et al. |
| 10,368,129 | B2 | 7/2019 | Skarakis |
| 10,368,226 | B2 | 7/2019 | Smith et al. |
| 10,455,383 | B2 | 10/2019 | Bozionek et al. |
| 11,336,474 | B2 | 5/2022 | Schmitz |
| 11,558,437 | B2 | 1/2023 | Ruetschi et al. |
| 2013/0024772 | A1 * | 1/2013 | Delia .................... G06Q 10/00 |
| | | | 715/730 |
| 2018/0089387 | A1 | 3/2018 | Swank |
| 2021/0076105 | A1 | 3/2021 | Parmar et al. |

* cited by examiner

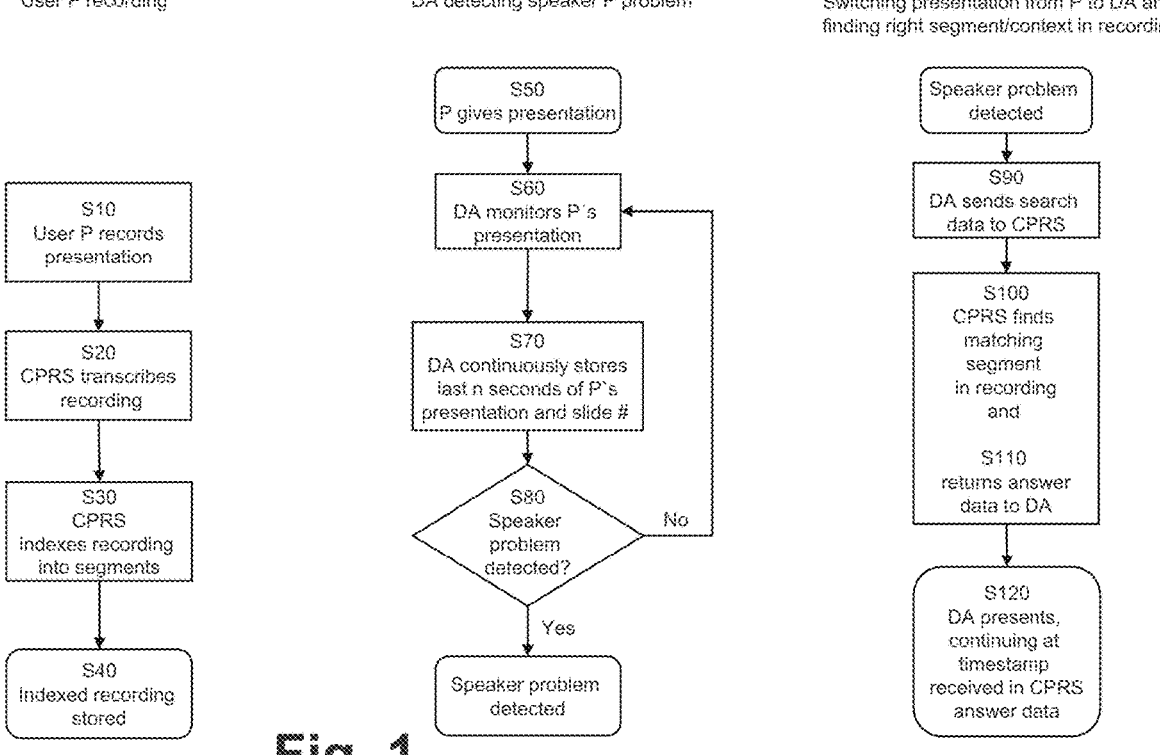

User P recording

DA detecting speaker P problem

Switching presentation from P to DA and
finding right segment/context in recording S50
P gives presentation S10
User P records
presentation S60
DA monitors P's
presentation Speaker problem
detected S90
DA sends search
data to CPRS S20
CPRS transcribes
recording S70
DA continuously stores
last n seconds of P's
presentation and slide #

S100
CPRS finds
matching
segment
in recording
and

S30
CPRS
indexes recording
into segments

S80
Speaker
problem
detected?

No

S110
returns answer
data to DA

Yes

S40
Indexed recording
stored

Speaker problem
detected

S120
DA presents,
continuing at
timestamp
received in CPRS
answer data

Fig. 1

CONTEXTUAL DIGITAL ASSISTANT FOR PRESENTATION ASSISTANCE

CROSS-REFERENCE TO RELATED APPLICATIONS

This application claims priority to U.S. Provisional Patent Application No. 63/578,085, which was filed on Aug. 22, 2023. This application also claims priority to European Patent Application No. EP 23194356.4, which was filed on Aug. 30, 2023.

FIELD

The present invention relates to a method for presentation assistance and a system which is adapted to perform said method.

BACKGROUND

In recent years, online meetings have become more and more popular. However, giving presentations in online meetings is not always easy and goes smoothly for several reasons. The speaker could run into trouble while he/she is giving a presentation so there is the danger that the quality suffers, or the goal of the presentation will not be reached. A digital assistant (DA) also known as a voice assistant or intelligent personal assistant is an advanced software that enables information retrieval, dialogue, and assistance services through communication in natural human speech by performing speech analysis for speech recognition, usually over the internet. Digital assistants (DAs) are used in various domains due to their capability of generating conversations naturally. They can perform tasks or services for an individual based on verbal commands. DAs may work via text messages, by receiving and responding to vocal commands as well as other interfaces such as image processing.

SUMMARY

We determined that digital assistants supporting presenters in calls that take commands, e.g. switch a recording on/off, carry out actions like performing a web search and display the results. There are also digital assistants described that take over pre-defined actions, e.g. notifying the other participants in case of the speaker suddenly dropping off the call. However, we determined that there is a need in the art for a presentation assistance wherein the DA takes a pre-recording of a speaker's presentation, monitors the progress of the live presentation and the performance of the speaker and continues with the presentation if the speaker is not able to do so anymore.

Therefore, embodiments of the present invention can be based on the object to provide a method for presentation assistance that allows seamlessly switching to a pre-recorded presentation, if necessary, and a corresponding system which is adapted to perform said method.

Embodiments of the present invention can provide a solution for continuing a presentation in an online meeting while also ensuring a high-quality where otherwise a disruption, an early end of the meeting and/or a loss of quality would have occurred. Further, embodiments can provide assistance for a speaker in a real-time online session in order to be able to smoothly digitally deliver the content of a presentation.

According to some embodiments of the invention, a method for presentation assistance is provided, the method comprising the steps of: giving, by a speaker, a presentation in an online meeting; monitoring, by a digital assistant (DA), the presentation; storing, by the DA; search data of the presentation; checking, by the DA, whether the speaker has a problem; sending, by the DA, the search data to a contextual presentation recording system (CPRS) in case the speaker has a problem; finding, by the CPRS, a matching segment to the search data in a recording of the presentation; returning, by the CPRS, answer data to the DA; continuing, by the DA, the presentation according to the answer data received by the CPRS.

After that, the method is usually terminated.

According to a preferred embodiment, the method further comprises the steps of: recording, by the speaker, the presentation at the CPRS before the online meeting takes place; transcribing, by the CPRS, the recording into text; indexing, by the CPRS, the recording into segments; storing, by the CPRS, the indexed recording.

According to another preferred embodiment, the step of recording the presentation may be performed via multiple channels, preferably these channels are audio, video and/or screen share.

In the meaning of the present invention, screen sharing could be any digital presentation known in the art, e.g. a Microsoft PowerPoint presentation, etc.

According to a further preferred embodiment, indexing of the recording may be performed automatically or manually based on the speaker's input.

According to another preferred embodiment, the steps of monitoring the presentation and checking whether the speaker has a problem by the DA, respectively, comprise monitoring the network performance, the speech performance of the speaker, the biometric health data of the speaker, the frequency of the use of filler words, and/or the sound quality of the environment.

In another preferred embodiment, the search data comprise the last n seconds and one or more slide(s) of the presentation, wherein n is selected from 5 to 60, preferably 7 to 50, more preferably from 10 to 40, and most preferably from 14 to 30.

According to still another preferred embodiment, the DA sends the search data to the CPRS permanently.

According to another preferred embodiment, the DA stores the search data in an internal subunit or in an external database.

According to yet another preferred embodiment, the answer data comprise a timestamp position, and the presentation recording or access to it.

Further, according to a preferred embodiment, the problem is selected from technical problems and/or personal problems.

According to yet another preferred embodiment, the technical problems comprise bad network connection, microphone problems, background noise, or local endpoint (EP) problems and/or the personal problems comprise coughing, stuttering, nervousness, dizziness, becoming sick, black out of the speaker, or a complete failing of his/her voice.

According to still another preferred embodiment, the method further comprises the steps of: rejoining, by the speaker, the online meeting in case the personal and/or technical problem does no longer exist; communicating, by the DA, adjustments of the presentation to the speaker; ending the method.

According to yet another preferred embodiment, the adjustments are selected from pending questions or comments.

According to still another preferred embodiment, the adjustments are communicated via text to the speaker.

A system is also provided. The system can be adapted to perform an embodiment of the inventive method.

According to a preferred embodiment, the system comprises a database, a conference server, a digital assistant, and a recording tool. Preferably said recording tool is a contextual presentation recording system (CPRS).

Further, according to another preferred embodiment, the recording tool/CPRS is installed into the personal computer of the speaker or is available via a web service.

In the meaning of the present invention, the terms "speaker" and "presenter" are used interchangeably for an individual giving a presentation in an online meeting via telecommunications technology.

It has also to be noted that aspects of the invention have been described with reference to different subject-matters. In particular, some aspects or embodiments have been described with reference to system type claims whereas other aspects have been described with reference to method type claims. However, a person skilled in the art will gather from the above and the following description that, unless otherwise notified, in addition to any combination between features belonging to one type of subject-matter also any combination between features relating to different types of subject-matters is considered to be disclosed with this text. In particular, combinations between features relating to the system type claims and features relating to the method type claims are considered to be disclosed. The invention and embodiments thereof will be described below in further detail in connection with the drawing(s).

Other details, objects, and advantages of the telecommunications apparatus, system, device, non-transitory computer readable medium, and method will become apparent as the following description of certain exemplary embodiments thereof proceeds.

BRIEF DESCRIPTION OF THE DRAWINGS

The invention and embodiments thereof will be described below in further detail in connection with the drawing(s).

FIG. 1 shows a schematic illustration of the method according to an embodiment of the invention.

Figure 2:
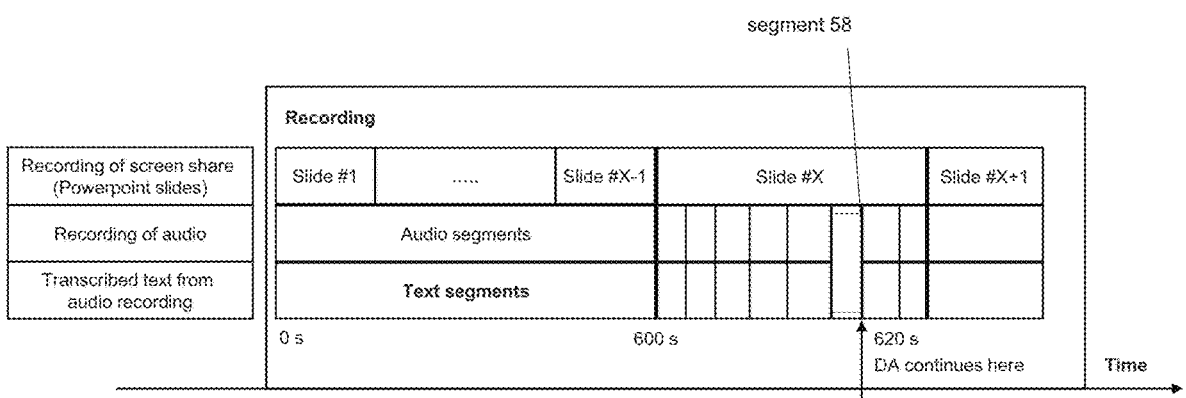
FIG. 2 shows a schematic illustration of the search of the CPRS for a matching segment of the recording according to an embodiment of the invention.

Reference numerals used in the drawings include:
(User) P speaker/presenter
DA digital assistant
CPRS contextual presentation recording system
n time variable
S second(s)
X variable for number of slide(s)
RTC real-time communication
RT real-time
Appl application
SSh screen sharing
EP Endpoint
N variable quantity

DETAILED DESCRIPTION

FIG. 1 schematically shows the method according to an embodiment of the present invention. In step S10, the speaker User P records his/her presentation via audio and screen share at a recording tool. The recording tool can include a communication device (e.g. laptop computer device, tablet, smart phone, etc.) that can include a processor connected to non-transitory memory and at least one transceiver. The recording tool can facilitate recording for storage locally in the memory of the device or via a remote server that can be communicatively connected to the recording tool.

The recording tool according to the present invention can be or include a contextual presentation recording system (CPRS) which may either be installed onto the personal computer or other computer device (e.g. laptop, smart phone, tablet, etc.) of the speaker or may be available via access to a web service, for example, a program/an application/a service which is hosted in a cloud and is accessible via a browser. For a cloud based service, it should be appreciated that such a service can be hosted by one or more servers having at least one processor connected to a non-transitory memory and at least one transceiver for supporting communications between devices for use of the hosted service.

After the recording, the CPRS may perform a pre-processing of the recording in the steps S20 and S30 by transcription using speech to text (STT), indexing, and/or segmentation. In the meaning of the present invention, segmentation may comprise splitting the recording into sections according to shown content during the screen share and/or automatic detection of sentences, or intents, or setting manual markers by the speaker. The segmentation can ensure an easier searching by the CPRS of the recording. This segmentation may be done automatically, or manually by the speaker, User P. The recording is completed by storing the indexed recording either internally in a subunit of the CPRS or in an external database. According to the present invention, while an online meeting takes place in which User P gives a presentation in step S50 via audio and screen share, a digital assistant is used that interacts with the online meeting tool. In the meaning of the present invention, said online meeting tool may be Microsoft Teams, Unify Office, Cisco WebEx, etc. Preferably, the use of the DA is not shown to the other participants of the online meeting. In step S60, the DA monitors the presentation in terms of network performance, speech-performance of the speaker, biometric health data of the speaker, frequency of the use of filler words, and/or sound quality of environment, e.g., noise level. Biometric health data may comprise blood pressure, pulse, and/or sweating. The digital assistant continuously stores the last n seconds and one or more slide(s) of the presentation in step S70, wherein n is as defined above. If no problems are detected, the DA continues to monitor the presentation. If the DA detects a problem with the speaker User P in step S80, it will send search data to the CPRS in step S90. Search data may be one or more slide(s) of the presentation, and/or the last n seconds of the transcribed text. In another preferred embodiment, the DA may send search data permanently to the CPRS regardless of the occurrence of a problem during the presentation. This provides for a faster switching in case a speaker's problem has been detected. In the next step, S100, the CPRS finds a matching segment in the recording of the presentation which is returned by the CPRS to the DA as answer data in step S110. The answer data may comprise the presentation recording or access to the presentation and the timestamp where the presentation should be continued. According to the timestamp received from the CPRS in the answer data, the DA will continue the presentation in step S120.

The DA can be a computer device or hosted by a computer device. For example, the DA can be a component of a user's computer device (e.g. smart phone, tablet, personal computer, etc.) or can be provided via a cloud based service that can be hosted by a server that has a processor connected to a non-transitory computer readable medium. The DA can be a computer device that can communicatively connect to the CPRS, exchange data with the CPRS, and/or interact with the CPRS for example.

FIG. 2 shows a schematic illustration of the search of the CPRS for a matching segment of the recording to the search data according to an embodiment of the invention. As mentioned above, the recording of the presentation may be performed via audio, screen share and/or as a transcribed text from the audio. The recording may be segmented into slides, audio segments, and text segments, respectively. There may be different segmentation options for the recording of the presentation. The recording may be segmented into one or more sentence(s). Another possibility may be the segmentation into n seconds, wherein n is as defined above. Further, the recording could be segmented into intents, or it could be segmented based on indexes including markers. Also, it may be possible, that no segmentation is performed, thus the whole text may be searched. In the embodiment shown in FIG. 2, the recording is segmented into different slides, namely slide #1, etc., slide #X−1, slide #X, slide #X+1. The CPRS receives search data from the DA for audio and screen share, e.g. the last 15 seconds and slide #X presented by User P before he/she developed a problem and was not able to continue the presentation. In the embodiment of FIG. 2, a given sentence or a best match in terms of the number of matching words is found in the recording of the presentation at segment 58, which ends at timestamp 620 seconds. The CPRS may return the recording (or may give access to it) with the timestamp at position 620 seconds back to the DA, thus, the DA is able to continue the presentation on behalf of User P from the recording at the segment and timestamp received from the CPRS in the answer data.

However, the 620 seconds are the resulting timestamp of the specific position in the recording from where the DA shall continue the presentation, whereas the 15 seconds mentioned are the last n seconds (duration) of the audio presentation before User P failed, used by the CPRS to search (search data, together with slide #X) for a corresponding match in the recording (segment 58).

Intents may be a couple of sentences that together form a topic. For example, there may be three topics on the slide that is part of the recording. These three topics and the corresponding recording may form an intent.

Figure 3:
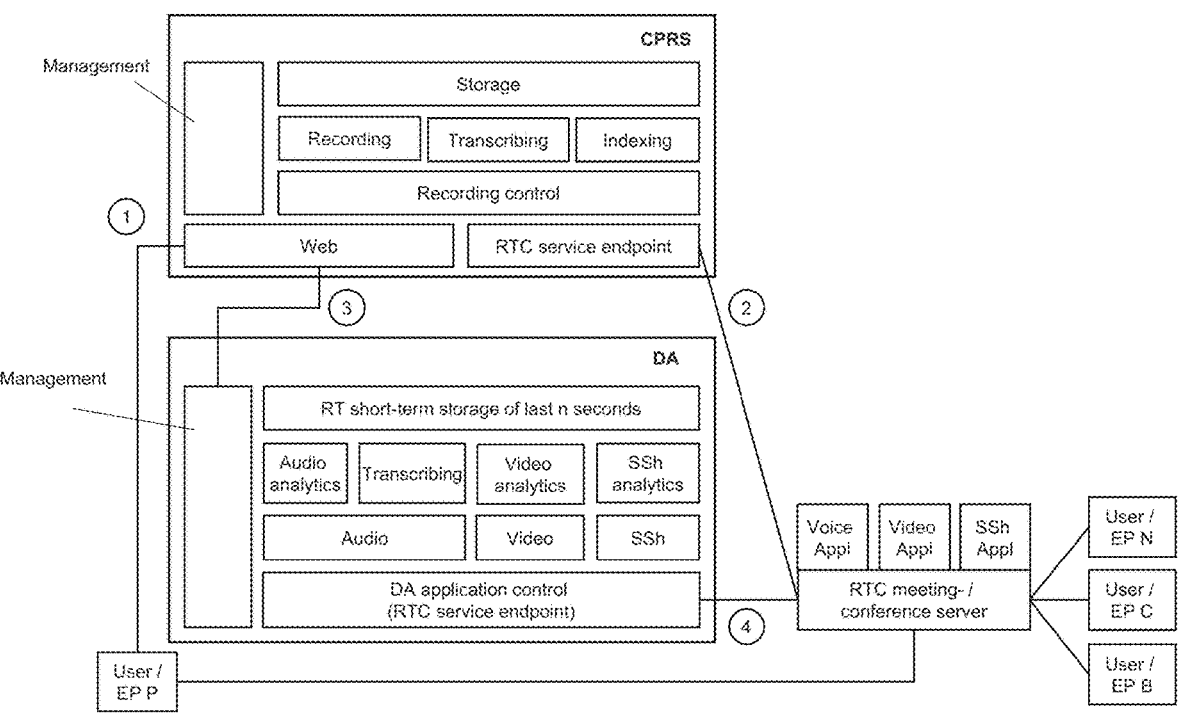
FIG. 3 shows a schematic illustration of the system according to an embodiment of the invention.

FIG. 3 shows a schematic illustration of the system according to an embodiment of the invention. The CPRS is used by User P to create a recording of his/her presentation. The recording may either be performed web based (1) or via RTC (Real-Time Communication, 2). The CPRS may include an RTC endpoint which uses a SIP (session initiation protocol), a Web-RTC or a proprietary RTC protocol. As already mentioned above, indexing of the recording may be performed automatically or manually by the speaker. Another entity of the system is the digital assistant (DA), which is a special type of conference participant in the online meeting and may be brought into the conference either by User P manually, by the CPRS, or pre-arranged by the conference server (e.g. whenever User P starts the presentation). Preferably, the DA is hidden from the other participants of the meeting. During a presentation, the DA monitors the presentation by continuously storing the last n seconds and one or more slide(s) of the presentation. Further, it transcribes the audio to text for possible searching in the recording later in the presentation if a problem of the speaker occurs. A possible problem may be detected by the DA via Audio analytics (on-prem or cloud based) (4). On-premises software (which can be abbreviated to on-prem) is installed and runs on computers on the premises of the person or organization using the software, rather than at a remote facility such as a server farm or cloud. On-premises software is sometimes referred to as "shrinkwrap" software, and off-premises software is commonly called "software as a service" ("SaaS") or "cloud computing".

The software can comprise database and modules that are combined to particularly serve the unique needs of the large organizations regarding the automation of corporate-wide system and its functions.

After a problem of the speaker has been detected by the DA, it may send search data (last n seconds of the transcribed text of the presentation, plus slide number) to the CPRS in order to find the matching recording segment. When the CPRS has found a matching segment, it sends answer data to the DA including the recording or access to the recording, together with the timestamp where to continue with the presentation (3). After having received the answer data (4), the DA will continue with the presentation from the recording at the matching segment.

FIGS. 4 to 7 show schematic illustrations of the method according to different embodiments of the invention with audio and screen share synthesis.

Figure 4:
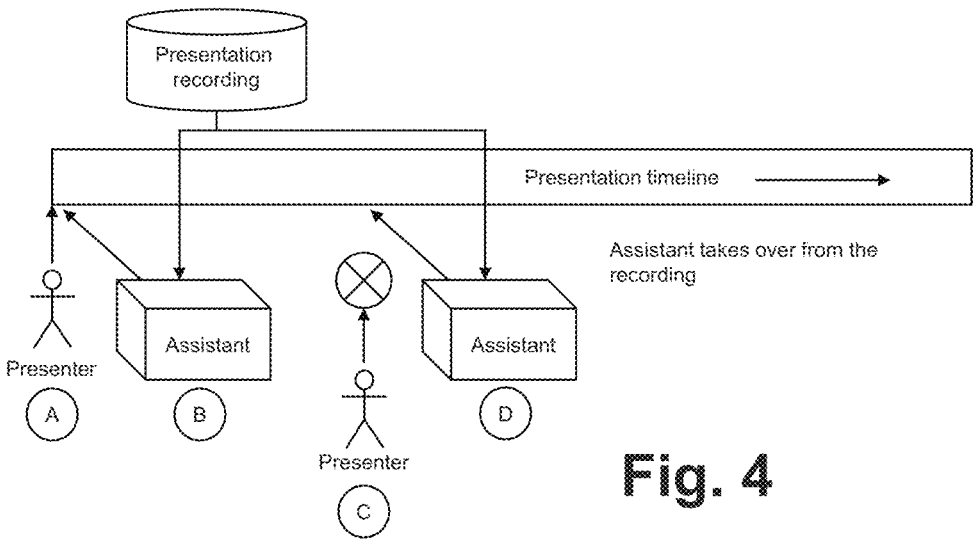
FIG. 4 shows a schematic illustration of an exemplary embodiment of a method with audio and screen share synthesis.

In FIG. 4, an embodiment is shown in which the speaker is not able to deliver the presentation to the end, and the DA takes over audio and screen share. The speaker starts delivering the presentation with screen share of the slides to the other participants of the online meeting (A). The DA follows the presentation based on the recording of the presentation (B). Again, the speaker develops a problem and cannot continue with the presentation (C). As mentioned above, the problem could be a technical one or a personal one. The DA detects the problem of the speaker and may take over the presentation by synthesizing the speakers voice based on the recording (D). Thus, the DA adjusts the pace and intonation based on the problem of the speaker the DA has observed. For example, the speaker could have been talking faster due to nervousness or he/she could have had a raspier voice due to a cold. In addition, the DA also takes over the screen share and adjusts the slides to match the recording.

Figure 5:
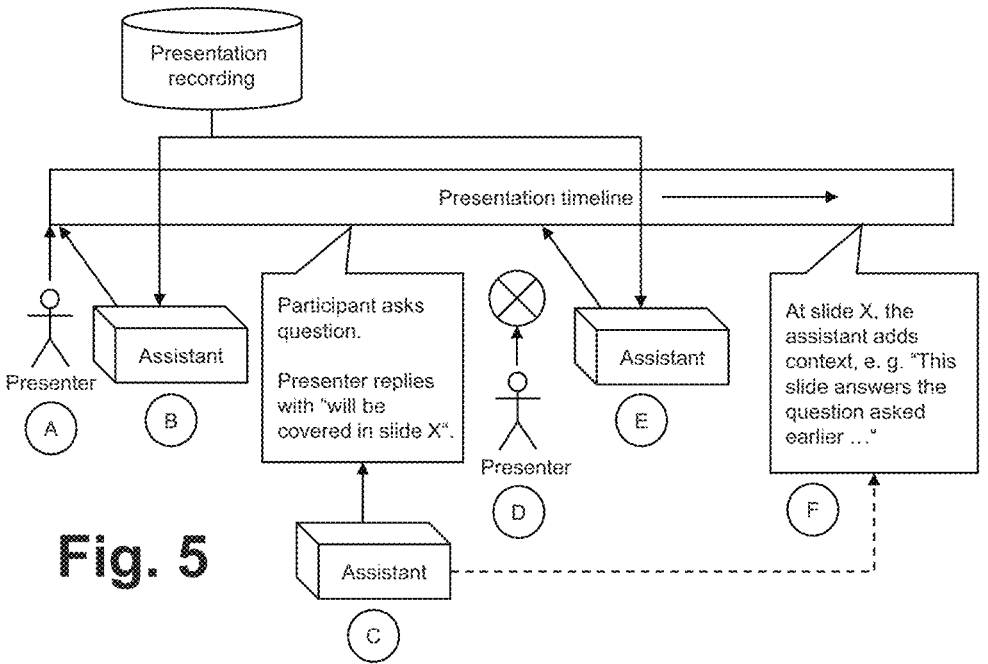
FIG. 5 shows a schematic illustration of an exemplary embodiment of a method with audio and screen share synthesis.

In FIG. 5, another embodiment is shown wherein the DA follows the context of the presentation and adjusts its contents. As in the embodiment shown in FIG. 4, the speaker starts delivering the presentation to the other participants of the online meeting (A). The DA follows the presentation based on the recording (B). In the present embodiment, a participant asks a question, which the speaker answers by referring, e.g. to slide X where the question will be answered. The DA notices the reference to add context to the presentation later (C). Again, the speaker develops a problem that does not allow him/her to continue the presentation further (D). This is detected by the DA which takes over the presentation including screen share (E). When the DA gets to slide X, it will adjust the context of the presentation by mentioning the earlier question (F). Again, the DA synthesizes the presenter's voice based on the recording to add this context.

Figure 6:
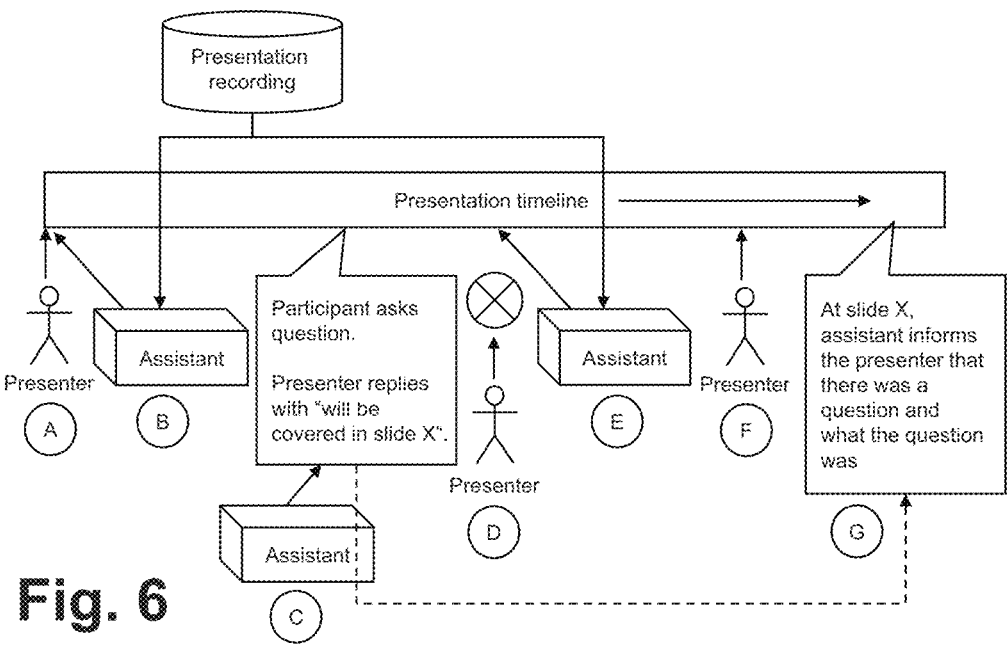
FIG. 6 shows a schematic illustration of an exemplary embodiment of a method with audio and screen share synthesis.

In the embodiment shown in FIG. 6, the DA helps the speaker to keep context after he/she rejoined the meeting before the presentation ends. Numerals (A) and (B) are as referred to in FIGS. 4 and 5. Earlier in the presentation, a participant asked a question while the speaker was still giving the presentation. The speaker answered with reference to a later slide, f. i., slide X. The DA noticed the reference to add context to the presentation later (C). After the question was asked, the speaker develops a problem (D), and the DA takes over the presentation (E). Contrary to the previous Figures, in the present embodiment, the speaker is able to rejoin the presentation after a while (F). The speaker takes over from the DA and continues the presentation. This may, for example, be done by manually dropping the DA by the presenter, e.g. via a GUI (Graphical User Interface) button. When the speaker gets to slide X, the DA reminds the speaker about the question (G). This may be done via speech to text, e.g. by posting a message privately to the speaker. This ensures that no question gets unanswered because the speaker may be too busy or flustered by the interruption earlier. Thus, the DA helps the speaker remember earlier exchanges in the presentation.

Figure 7:
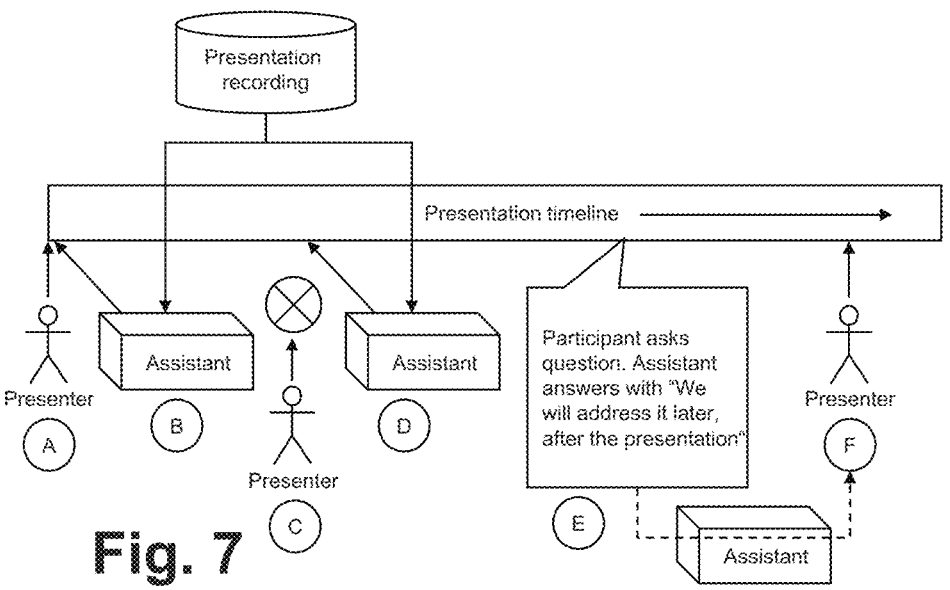
FIG. 7 shows a schematic illustration of an exemplary embodiment of a method with audio and screen share synthesis.

In the next embodiment shown in FIG. 7, numerals (A) to (D) are as described in FIG. 4. In the embodiment shown in FIG. 7, the DA notices a question being asked during the presentation, which the DA postpones. The question may have been asked while the speaker was absent, and the DA was giving the presentation. The DA may postpone the question with a generic answer like "we will address this later" (E). When the speaker rejoins the presentation, the DA lets him/her know that there is a pending question and the context of the question (F). This may again be performed by transcription from speech to text, e.g. by posting a message privately to the speaker by the DA. The DA may also add context to the question with a screenshot and a short audio/video clip of the respective part of the presentation.

FIGS. 8 to 11 show schematic illustrations of the method according to different embodiments of the invention with video synthesis.

Figure 8:
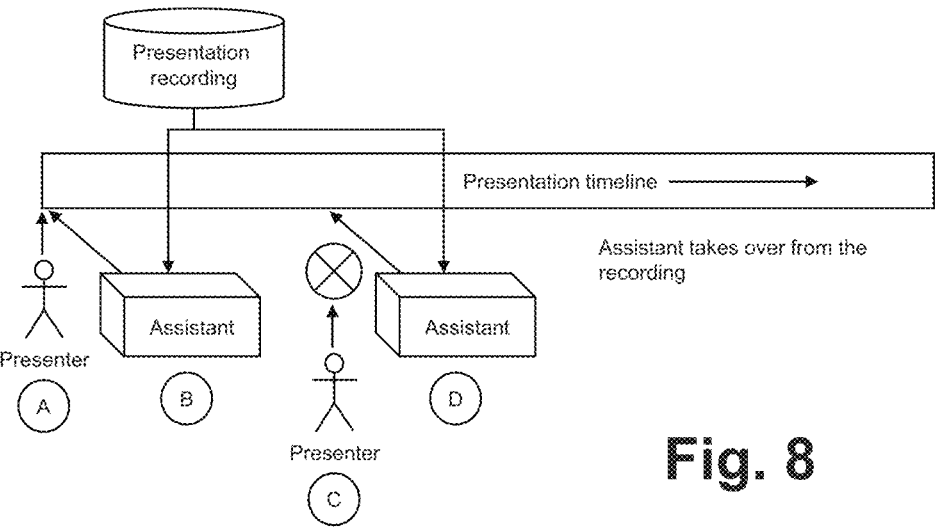
FIG. 8 shows a schematic illustration of an exemplary embodiment of the method with video synthesis.

The embodiment shown in FIG. 8 corresponds to the embodiment illustrated in FIG. 4 with the difference that the speaker is also streaming his/her video. Thus, the speaker starts delivering the presentation with screen share of the slides of his/her presentation (A). The DA follows the presentation based on the recording (B). The speaker develops a problem which does not allow him/her to continue the presentation further (C), thus, the DA takes over the presentation (D). In the present embodiment, in addition to audio and screen share (as done in the previous illustrated embodiments), the DA also synthesizes video of the speaker. The speaker's video may be synthesized either from a real-time (RT) video that the DA captured during the presentation or from an earlier sample which the speaker recorded to be used to train the DA.

Figure 9:
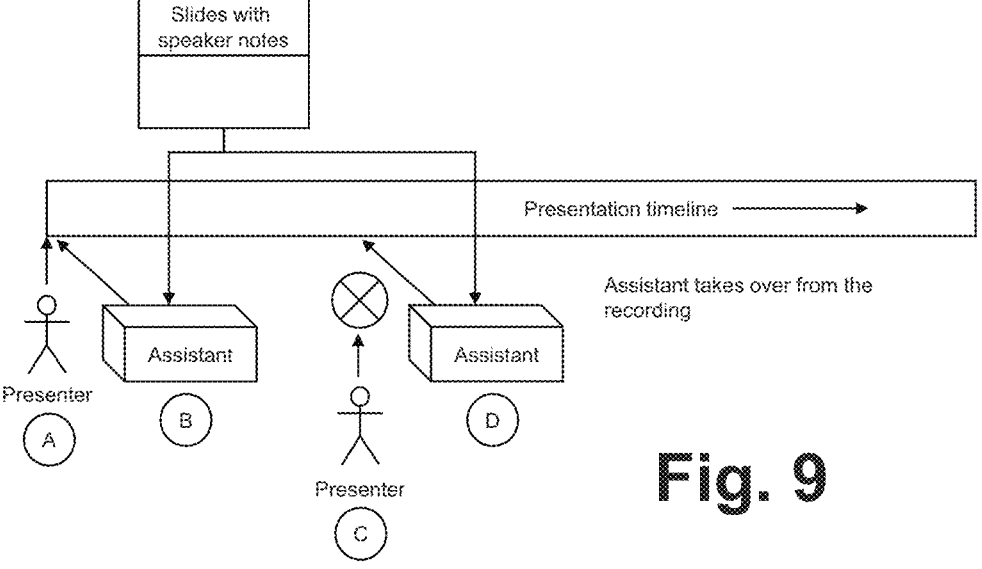
FIG. 9 shows a schematic illustration of an exemplary embodiment of the method with video synthesis.

In a still further embodiment, depicted in FIG. 9, the DA uses the speaker's notes in the slides to take over the presentation. The procedure is as described in the previous embodiment with the difference that as already mentioned, the DA uses the speaker's notes as a basis to continue the presentation and not the recorded voice; thus, the speaker starts his/her presentation in an online meeting (A) which is followed by a DA (B). During the presentation, the speaker develops a problem as a result of which he/she is not able to continue (C). The DA detects said problem and takes over from the recording using the speaker's notes in the slide to take over (D). The DA may synthesize audio, screen share and video. As mentioned above, video synthesis may be learned in real-time by the DA from the speaker's camera or from a pre-recorded sample.

Figure 10:
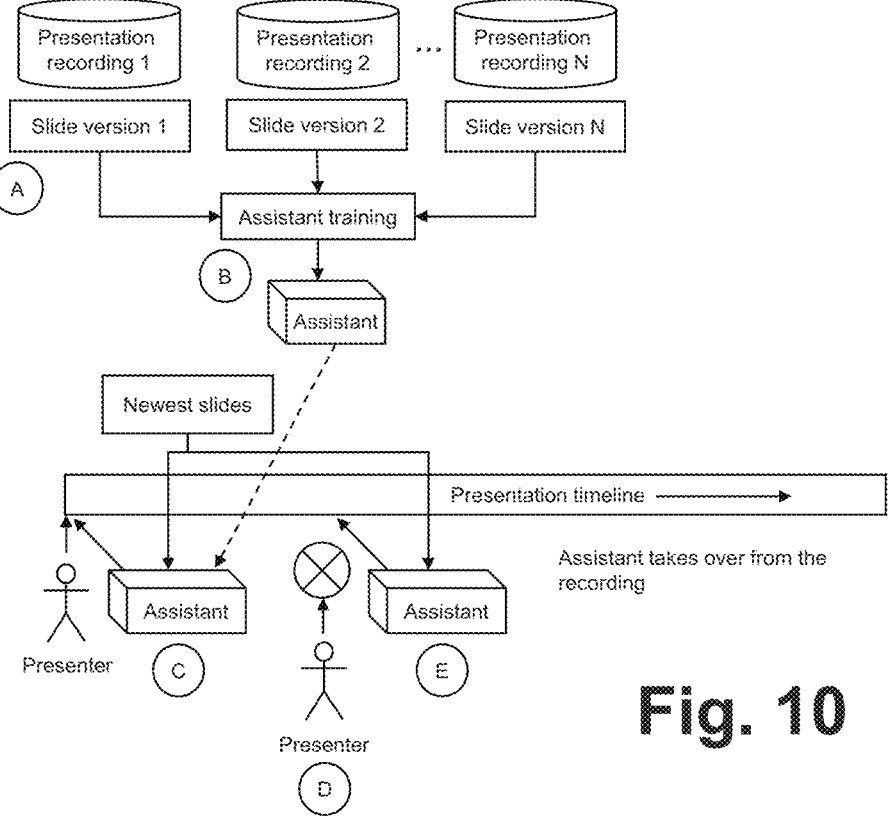
FIG. 10 shows a schematic illustration of an exemplary embodiment of the method with video synthesis.

Further, in FIG. 10, another embodiment of the present invention is illustrated. In general, it is common to give the same presentation more than once. The presentation may be slightly varied each time, thus several variations of a presentation may be recorded and stored (A). These variations may be updates of some of the slides based, e.g. on feedback from other participants, new developments in research, or giving the same presentation multiple times to multiple audiences. In the present embodiment, the DA is trained on different variations of the presentation (B). The DA follows the presentation based on the trained version it learned from the previous recordings (C). When the speaker has a problem and cannot continue the presentation (D), the DA realizes this and takes over again, including screen share, using what it learned from the previous recordings (E).

Figure 11:
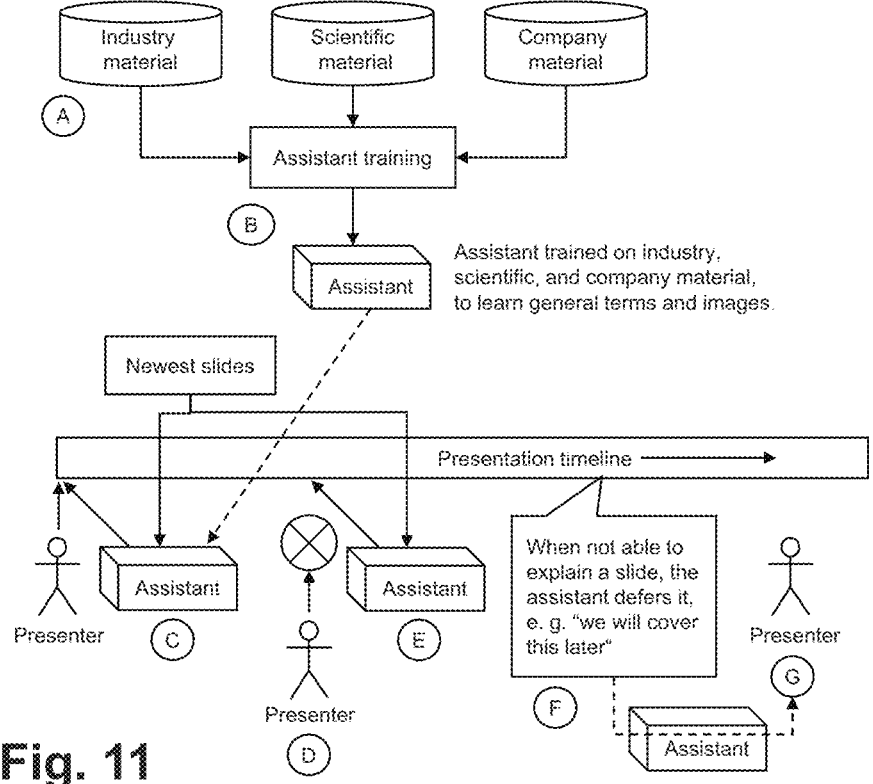
FIG. 11 shows a schematic illustration of an exemplary embodiment of the method with video synthesis.

In FIG. 11, another embodiment is illustrated wherein the presentation may cover well-known material in specific industries, scientific areas, and companies. This well-known material may be collected (A) and used to train the DA on general topics relevant to presentations used in the environment the DA will be used in (B). For example, slides that show the typical network OSI (Open Systems Interconnection) layers, or the typical deployment of Kubernetes in a multi-zone cloud environment, can be learned from general material. During a presentation, the DA follows it based on the trained version of the previous recordings (C). In case the DA takes over a presentation due to a problem of the speaker, the DA may use the trainings on the general material to discuss the contents of the slides of the presentation, even if limited at a general level when adequate training material is unavailable (D and E). If the DA finds a slide that it lacks enough training on, it may defer the slide to later, with a general comment such as "we will cover this material later" (F). If the speaker rejoins the presentation, the DA may let him/her know that specific slides were skipped for lack of training. The speaker may then revisit these slides at any time during the presentation (G).

It should be noted that the term "comprising" does not exclude other elements or steps and the "a" or "an" does not exclude a plurality. Further, elements described in association with different embodiments may be combined.

It should also be noted that reference signs in the claims shall not be construed as limiting the scope of the claims.

It should be appreciated that different embodiments of the method, communication system, communication apparatus, and non-transitory computer readable medium can be developed to meet different sets of design criteria. For example, the particular type of network connection, server configuration or client configuration for a device for use in embodiments of the method can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, telecommunication device, computer device, a network, a server, a communication system, and methods of making and using the same have been shown and described above, it is to be distinctly understood that the invention is not limited thereto but may be otherwise variously embodied and practiced within the scope of the following claims.

What is claimed is:

1. A method for presentation assistance, the method comprising the steps of:

giving, by a speaker, a presentation in an online meeting;

monitoring, by a digital assistant (DA), the presentation;

storing, by the DA, search data of the presentation;

checking, by the DA, whether the speaker has a problem;

sending, by the DA, the search data to a contextual presentation recording system, (CPRS), in case the speaker has a problem;

finding, by the CPRS, a matching segment to the search data in a recording of the presentation;

returning, by the CPRS, answer data to the DA;

continuing, by the DA, the presentation of the speaker according to the answer data received from the CPRS.

2. The method according to claim 1, wherein the method further comprises:

recording, by the speaker, the presentation at the CPRS before the online meeting takes place;

transcribing, by the CPRS, the recording into text;

indexing, by the CPRS, the recording into segments;

storing, by the CPRS, the indexed recording.

3. The method according to claim 2, wherein the step of recording the presentation is performed in multiple channels.

4. The method according to claim 3, wherein the channels are selected from audio, video and/or screen share.

5. The method according to claim 2, wherein the indexing of the recording is performed automatically or manually based on the speaker's input.

6. The method according to claim 1, wherein the search data comprises the last n seconds and one or more slide(s) of the presentation.

7. The method according to claim 1, wherein the DA sends the search data to the CPRS permanently.

8. The method according to claim 1, wherein the answer data comprises a timestamp position, and the presentation recording or access to it.

9. The method according to claim 1, wherein the problem is a technical problem and/or a personal problem.

10. The method according to claim 9, wherein:

the technical problem comprises at least one of: bad network connection, microphone problems, background noise or local endpoint (EP) problems and/or wherein the personal problem includes at least one of: coughing, stuttering, nervousness, dizziness, becoming sick, black out of the speaker or a complete failing of his/her voice.

11. The method of claim 1, wherein the method further comprises:

rejoining, by the speaker, the online meeting, in case the personal and/or technical problem does no longer exist;

communicating, by the DA, adjustments of the presentation to the speaker.

12. The method according to claim 11, wherein the adjustments are selected from pending questions or comments and/or wherein the adjustments are communicated via text to the speaker.

13. A system for presentation assistance, the system comprising:

a digital assistant (DA), the DA being communicatively connectable to a contextual presentation recording system, (CPRS);

the system configured such that an online presentation is monitorable by the DA and search data of the presentation is storable by the DA;

the DA configured to check whether a speaker of an online presentation has a problem and send the search data to the CPRS in an event the problem is determined to exist via a performed check for the CPRS to find a matching segment to the search data in a recording of the online presentation and return answer data to the DA;

the DA configured to continue the online presentation based on the answer data.

14. The system according to claim 13, wherein the system comprises a database, a conference server, the DA, and the CPRS.

15. The system according to claim 14, wherein the CPRS is installed into a personal computer device of the speaker or is available via a web service.

16. The system of claim 13, comprising the CPRS.

17. The system of claim 16, wherein the CPRS includes a processor connected to a non-transitory computer readable medium.

18. The system of claim 13, wherein the DA comprises a processor connected to a non-transitory computer readable medium.

* * * * *